(12) United States Patent
Ishikawa

(10) Patent No.: US 11,895,279 B2
(45) Date of Patent: Feb. 6, 2024

(54) IMAGE READING DEVICE AND IMAGE FORMING APPARATUS

(71) Applicant: FUJIFILM Business Innovation Corp., Tokyo (JP)

(72) Inventor: Takuya Ishikawa, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/888,413

(22) Filed: Aug. 15, 2022

(65) Prior Publication Data

US 2023/0308574 A1  Sep. 28, 2023

(30) Foreign Application Priority Data

Mar. 25, 2022  (JP) ................................ 2022-050474

(51) Int. Cl.
*H04N 1/028* (2006.01)
*H04N 1/10* (2006.01)
*H04N 1/00* (2006.01)

(52) U.S. Cl.
CPC ..... *H04N 1/02885* (2013.01); *H04N 1/00408* (2013.01); *H04N 1/02815* (2013.01); *H04N 1/1061* (2013.01)

(58) Field of Classification Search
CPC .. H04N 13/139; H04N 13/356; H04N 13/398; H04N 13/341; H04N 13/111;

(Continued)

(56) References Cited

U.S. PATENT DOCUMENTS 8,094,347 B2 * 1/2012 Lapstun ............ H01L 27/14678
358/1.18
8,736,917 B2 * 5/2014 Murata .................. H04N 1/193
358/475

(Continued)

FOREIGN PATENT DOCUMENTS

JP        H08227053        9/1996

*Primary Examiner* — Negussie Worku
(74) *Attorney, Agent, or Firm* — JCIPRNET

(57) ABSTRACT

An image reading device includes a placement portion in which a placement surface on which an original document is placed is formed, an imaging portion that is arranged on a center side of the placement surface in an apparatus width direction above the placement surface in an apparatus upward and downward direction and images the original document, a display portion having a display screen of which at least a part is arranged on a far side of the placement surface in an apparatus depth direction and the center side of the placement surface in the apparatus width direction between the placement surface and the imaging portion in the apparatus upward and downward direction, an irradiation portion that is arranged on the center side of the placement surface in the apparatus width direction above the display portion in the apparatus upward and downward direction and irradiates the placement surface with light, and a pair of other irradiation portions that are respectively arranged on both sides of the irradiation portion in the apparatus width direction above the display portion in the apparatus upward and downward direction and irradiate the placement surface with light.

20 Claims, 15 Drawing Sheets

(58) Field of Classification Search
CPC ......... H04N 21/440281; H04N 21/816; H04N 21/4314; H04N 21/4316; H04N 21/4438; H04N 21/47; H04N 21/4858; H04N 13/00; H04N 13/305; H04N 13/31; H04N 13/315; H04N 13/32; H04N 13/354; H04N 13/144; H04N 13/363; H04N 5/445; H04N 5/45; H04N 7/173; H04N 9/3129; H04N 9/3164; G06F 3/0346; G06F 3/0486; G06F 3/038; G06F 3/0416; G06F 3/0425; G06F 3/04883; G09G 2320/0209; G09G 3/003; G09G 3/3648; G09G 2300/0861; G09G 2310/0251; G09G 2310/061; G09G 2320/0252; G09G 2330/021; G09G 3/3614; G09G 3/3677; G09G 3/3688; G09G 2310/08; G09G 3/36; G02B 30/00; G02B 27/102; G02B 27/145; G02B 30/23; G03B 35/26; G06T 1/0021; G06T 2201/0065; G06T 2207/10004; H01J 2237/15; H01J 2237/1536; H01J 2237/20207; H01J 2237/221; H01J 2237/30483; H01J 2237/31745; H01J 37/153; H01J 37/28; H01J 37/3005; H01J 37/3045; H01J 37/3056

USPC ........................................................ 358/475
See application file for complete search history.

(56) References Cited

U.S. PATENT DOCUMENTS

| | | | | |
|---|---|---|---|---|
| 9,004,359 | B2* | 4/2015 | Shearin | G06K 7/1096 235/462.43 |
| 9,367,721 | B2* | 6/2016 | Detwiler | G06K 7/1096 |
| 10,402,611 | B2* | 9/2019 | Hardin | G06K 7/1091 |
| 2009/0034017 | A1* | 2/2009 | Lapstun | H01L 27/14678 358/473 |
| 2012/0314264 | A1* | 12/2012 | Kimura | G03B 15/03 358/474 |
| 2013/0306727 | A1* | 11/2013 | Shearin | G06K 7/10 235/440 |
| 2013/0335786 | A1* | 12/2013 | Kimura | H04N 1/00519 358/474 |
| 2016/0364936 | A1* | 12/2016 | Gao | H04N 23/56 |
| 2022/0207969 | A1* | 6/2022 | Howard | G07G 1/0045 |
| 2022/0232138 | A1* | 7/2022 | Gao | H04N 1/02815 |
| 2023/0053499 | A1* | 2/2023 | Ishikura | H04N 1/19594 |
| 2023/0308574 | A1* | 9/2023 | Ishikawa | H04N 1/02885 358/475 |
| 2023/0308577 | A1* | 9/2023 | Ishikawa | H04N 1/0461 358/400 |

* cited by examiner

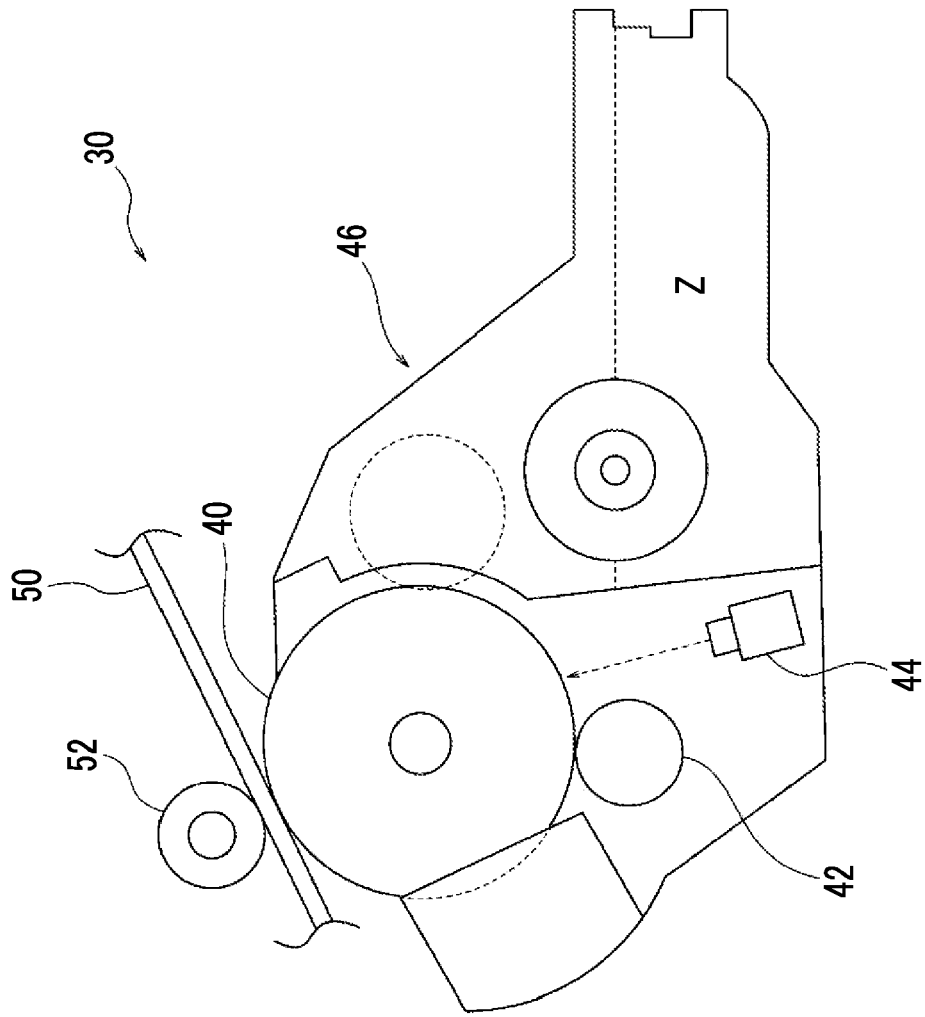
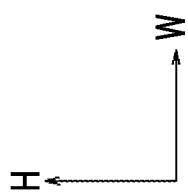

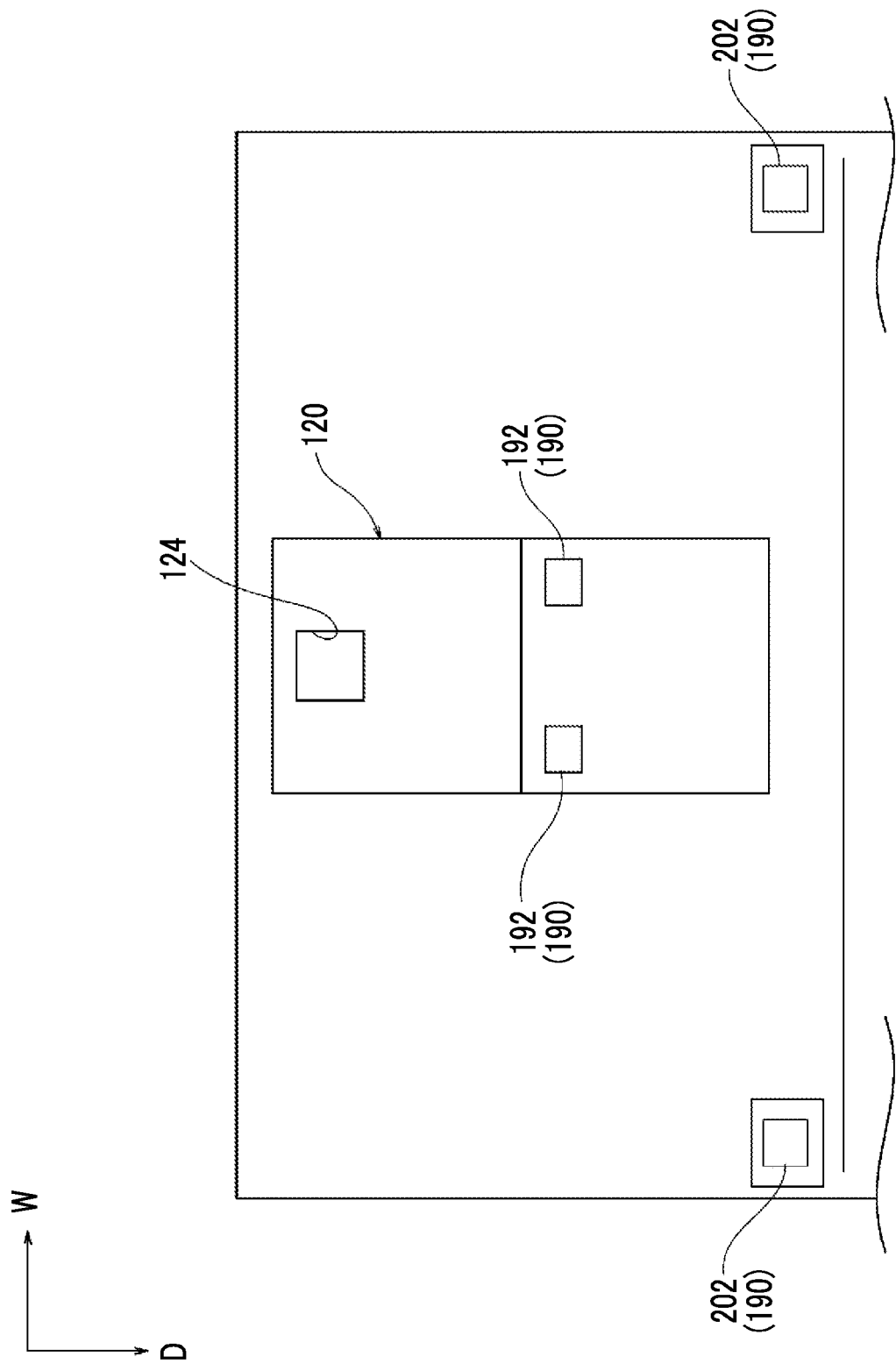

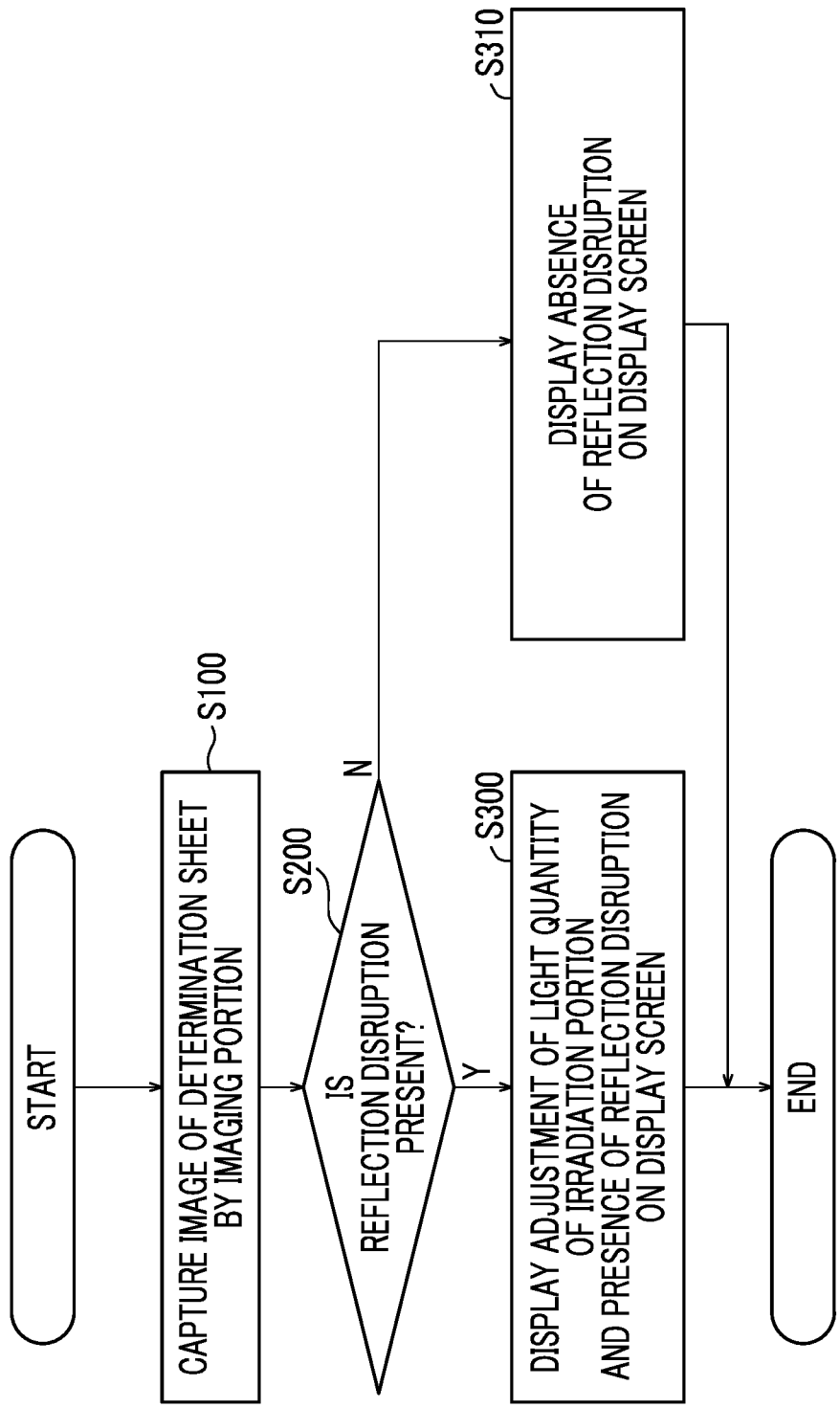

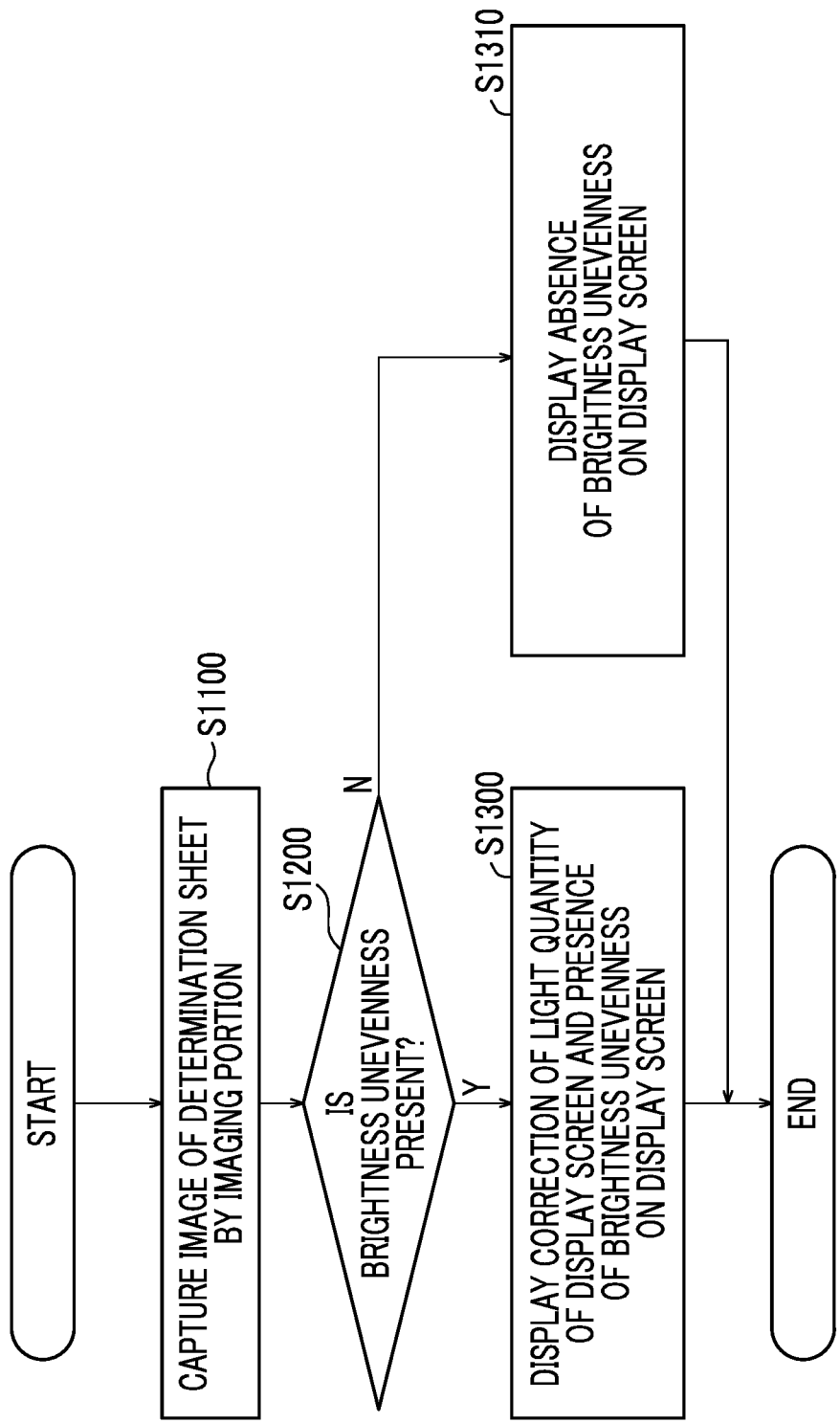

IMAGE READING DEVICE AND IMAGE FORMING APPARATUS

CROSS-REFERENCE TO RELATED APPLICATIONS

This application is based on and claims priority under 35 USC 119 from Japanese Patent Application No. 2022-050474 filed Mar. 25, 2022.

BACKGROUND

(i) Technical Field

The present invention relates to an image reading device and an image forming apparatus.

(ii) Related Art

A document camera device disclosed in JP1996-227053A includes a stage on which a document or the like is placed, an imaging section that captures an optical image of the document or the like on the stage, first and second reflection sections that are sequentially arranged on an optical path between the stage and the imaging section in order to convert an optical path of the optical image of the document or the like on the stage by reflection, and an illumination section that directly irradiates the first reflection section arranged closer to the stage out of the first and second reflection sections with light, in which an upper surface of the stage is directly irradiated with reflective light from the first reflection section.

SUMMARY

An image reading device that scans an original document may include an imaging portion that images an original document, a placement portion in which a placement surface on which the original document is placed is formed, an irradiation portion that irradiates the placement surface with light, and a display portion including a display screen on which information related to scanning is displayed.

The imaging portion may be configured to be arranged on a center side of the placement surface in an apparatus width direction, and the display portion may be configured to be arranged between the placement surface and the imaging portion in an apparatus upward and downward direction. In such a configuration, only one irradiation portion is arranged near the imaging portion, and brightness unevenness may occur in the original document because of overlapping between the light of the irradiation portion and light of the display screen.

Aspects of non-limiting embodiments of the present disclosure relate to an image reading device and an image forming apparatus that suppresses brightness unevenness occurring in an original document because of overlapping between light of an irradiation portion and light of a display screen, compared to a configuration in which only one irradiation portion is arranged near an imaging portion in a configuration in which a display portion is arranged between a placement surface and the imaging portion in an apparatus upward and downward direction.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an image reading device including a placement portion in which a placement surface on which an original document is placed is formed, an imaging portion that is arranged on a center side of the placement surface in an apparatus width direction above the placement surface in an apparatus upward and downward direction and images the original document, a display portion having a display screen of which at least a part is arranged on a far side of the placement surface in an apparatus depth direction and the center side of the placement surface in the apparatus width direction between the placement surface and the imaging portion in the apparatus upward and downward direction, an irradiation portion that is arranged on the center side of the placement surface in the apparatus width direction above the display portion in the apparatus upward and downward direction and irradiates the placement surface with light, and a pair of other irradiation portions that are respectively arranged on both sides of the irradiation portion in the apparatus width direction above the display portion in the apparatus upward and downward direction and irradiate the placement surface with light.

BRIEF DESCRIPTION OF THE DRAWINGS

Exemplary embodiment(s) of the present invention will be described in detail based on the following figures, wherein:

FIG. 2 is a schematic configuration diagram illustrating a toner image forming portion of the image forming apparatus according to the first exemplary embodiment of the present disclosure;

FIG. 11 is a bottom view illustrating an irradiation portion and the like of the image reading device according to the first exemplary embodiment of the present disclosure;

FIG. 13 is a flowchart illustrating steps when reflection disruption is determined in the image reading device according to the second exemplary embodiment of the present disclosure;

FIG. 15 is a flowchart illustrating steps when brightness unevenness is determined in the image reading device according to the third exemplary embodiment of the present disclosure.

DETAILED DESCRIPTION

First Exemplary Embodiment

An example of an image scanning portion and an image forming apparatus according to a first exemplary embodiment of the present disclosure will be described in accordance with FIG. 1 to FIG. 11. Arrow H illustrated in each drawing is a vertical direction and denotes an apparatus upward and downward direction. Arrow W is a horizontal direction and denotes an apparatus width direction. Arrow D is a horizontal direction and denotes an apparatus depth direction.

Overall Configuration of Image Forming Apparatus 10

Figure 1:
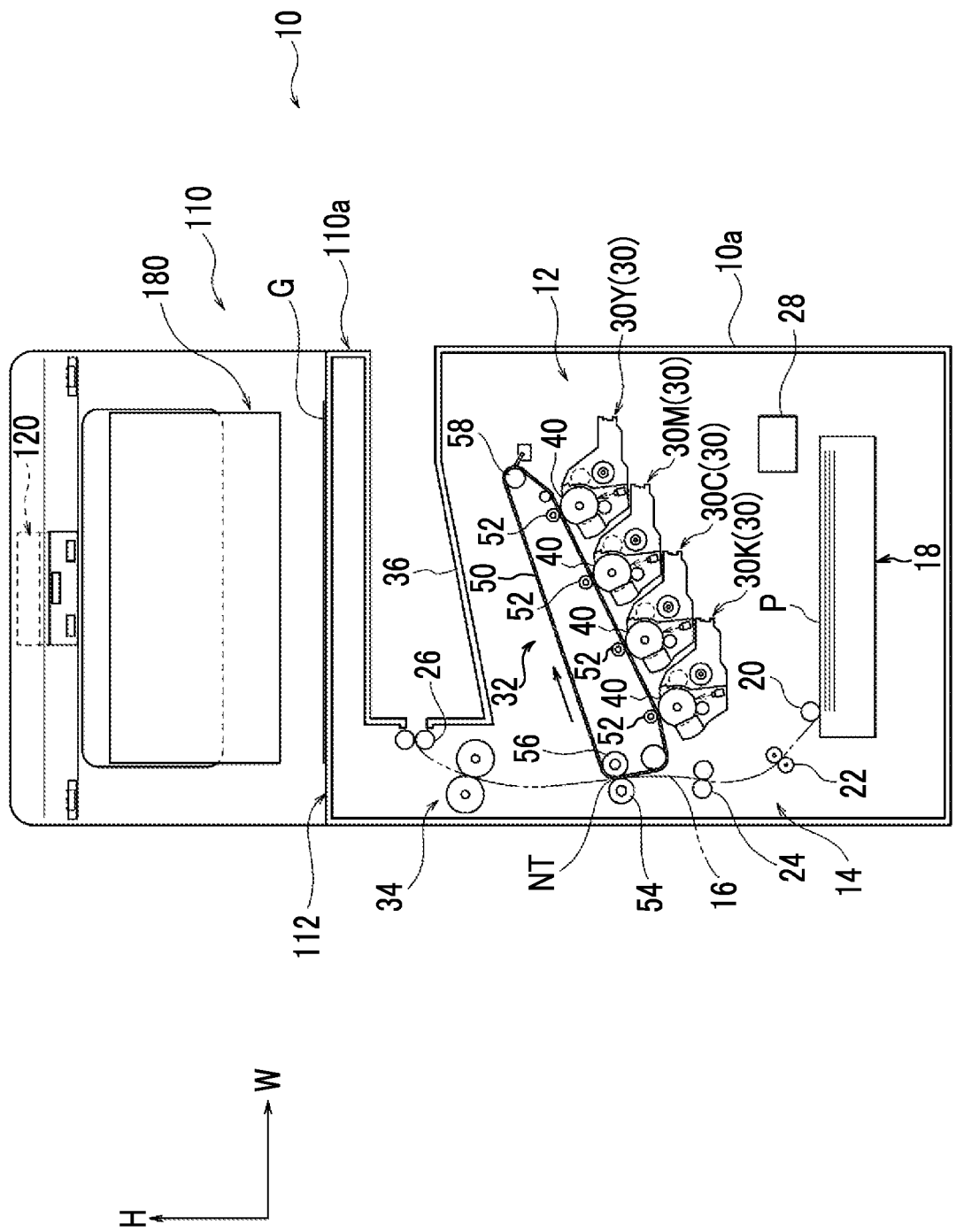
FIG. 1 is a schematic configuration diagram illustrating an image forming apparatus according to a first exemplary embodiment of the present disclosure.

As illustrated in FIG. 1, an image forming apparatus 10 includes an image scanning portion 110 that scans an image formed on an original document G, an image forming portion 12 that forms a toner image using an electrophotographic method, and a transport portion 14 that transports a sheet member P as a recording medium along a transport path 16. In addition, the image forming apparatus 10 includes an accommodation member 18 that accommodates the sheet member P, and a control portion 28 that controls the entire apparatus.

In the image forming apparatus 10 having the above configuration, the image formed on the original document G is scanned by the image scanning portion 110. In addition, the sheet member P accommodated in the accommodation member 18 is transported along the transport path 16 by the transport portion 14. Furthermore, the toner image formed by the image forming portion 12 is formed on the transported sheet member P, and the sheet member P on which the toner image is formed is discharged to an outside of an apparatus main body 10a.

Image Forming Portion 12

As illustrated in FIG. 1, the image forming portion 12 includes a plurality of toner image forming portions 30 each of which forms a toner image of each color, and a transfer portion 32 that transfers the toner image formed by the toner image forming portions 30 to the sheet member P. Furthermore, the image forming portion 12 includes a fixing device 34 that fixes the toner image transferred on the sheet member P by the transfer portion 32 to the sheet member P.

Toner Image Forming Portion 30

The plurality of toner image forming portions 30 are provided to form the toner image for each color. In the present exemplary embodiment, toner image forming portions 30Y, 30M, 30C, and 30K of total four colors of yellow (Y), magenta (M), cyan (C), and black (K) are provided. In the following description, Y, M, C, and K attached to the reference numerals will be omitted unless otherwise necessary to distinguish between yellow (Y), magenta (M), cyan (C), and black (K).

The toner image forming portion 30 of each color is basically configured in the same manner except for a used toner and, as illustrated in FIG. 2, includes an image carrier 40 of a cylindrical shape that rotates, and an electrostatic charger 42 that electrostatically charges the image carrier 40. Furthermore, the toner image forming portion 30 includes an exposure device 44 that forms an electrostatic latent image by irradiating the electrostatically charged image carrier 40 with exposure light, and a developing device 46 that develops the electrostatic latent image as the toner image using a developing agent Z including a toner. Accordingly, the toner image forming portion 30 of each color forms an image of each color using a toner of each color.

In addition, as illustrated in FIG. 1, the image carrier 40 of each color is in contact with a transfer belt 50 (details will be described later) that circulates. The toner image forming portions 30 of yellow (Y), magenta (M), cyan (C), and black (K) are arranged in this order from an upstream side of a circulation direction (refer to the arrow in FIG. 1) of the transfer belt 50.

Transfer Portion 32

As illustrated in FIG. 1, the transfer portion 32 includes the transfer belt 50, and primary transfer rolls 52 each of which is arranged on an opposite side to the image carrier 40 of each color with the transfer belt 50 interposed between the primary transfer roll 52 and the image carrier 40 and transfers the toner image formed by the image carrier 40 of each color to the transfer belt 50.

In addition, the transfer portion 32 includes a winding roll 56 on which the transfer belt 50 is wound, and a drive roll 58 on which the transfer belt 50 is wound and a rotational force is transmitted to the transfer belt 50. Accordingly, the transfer belt 50 circulates in a direction of the arrow in FIG. 1.

Furthermore, the transfer portion 32 includes a secondary transfer roll 54 that is arranged on an opposite side to the winding roll 56 with the transfer belt 50 interposed between the secondary transfer roll 54 and the winding roll 56 and transfers the toner image transferred on the transfer belt 50 to the sheet member P. A transfer nip NT at which the toner image is transferred to the sheet member P is formed between the secondary transfer roll 54 and the transfer belt 50.

In this configuration, the toner image is primarily transferred to the transfer belt 50 by the primary transfer rolls 52 in order of yellow (Y), magenta (M), cyan (C), and black (K). In addition, the toner image is transferred by the secondary transfer roll 54 from the transfer belt 50 to the sheet member P transported while being interposed between the transfer belt 50 and the secondary transfer roll 54. Furthermore, the sheet member P on which the toner image is transferred is transported toward the fixing device 34.

Fixing Device 34

As illustrated in FIG. 1, the fixing device 34 is arranged on a downstream side of the transfer nip NT in a transport direction of the sheet member P. The fixing device 34 fixes the toner image transferred on the sheet member P to the sheet member P by heating and pressurizing the toner image.

Transport Portion 14

As illustrated in FIG. 1, the transport portion 14 includes a feed roll 20 that feeds the sheet member P accommodated in the accommodation member 18 to the transport path 16, and a prevention roll 22 that prevents multiple feeding of the sheet member P fed by the feed roll 20. Furthermore, the transport portion 14 includes an adjustment roll 24 that adjusts a timing of the sheet member P to be fed to the transfer nip NT, and a discharge roll 26 that discharges the sheet member P on which the toner image is fixed by the fixing device 34 to the outside of the apparatus main body 10a.

Image Scanning Portion 110

As illustrated in FIG. 1, the image scanning portion 110 is arranged in an upper part of the image forming apparatus 10 and scans the image formed on the original document G. The image scanning portion 110 is an example of an image reading device. Details of the image scanning portion 110 will be described later.

General Configuration

Figure 3:
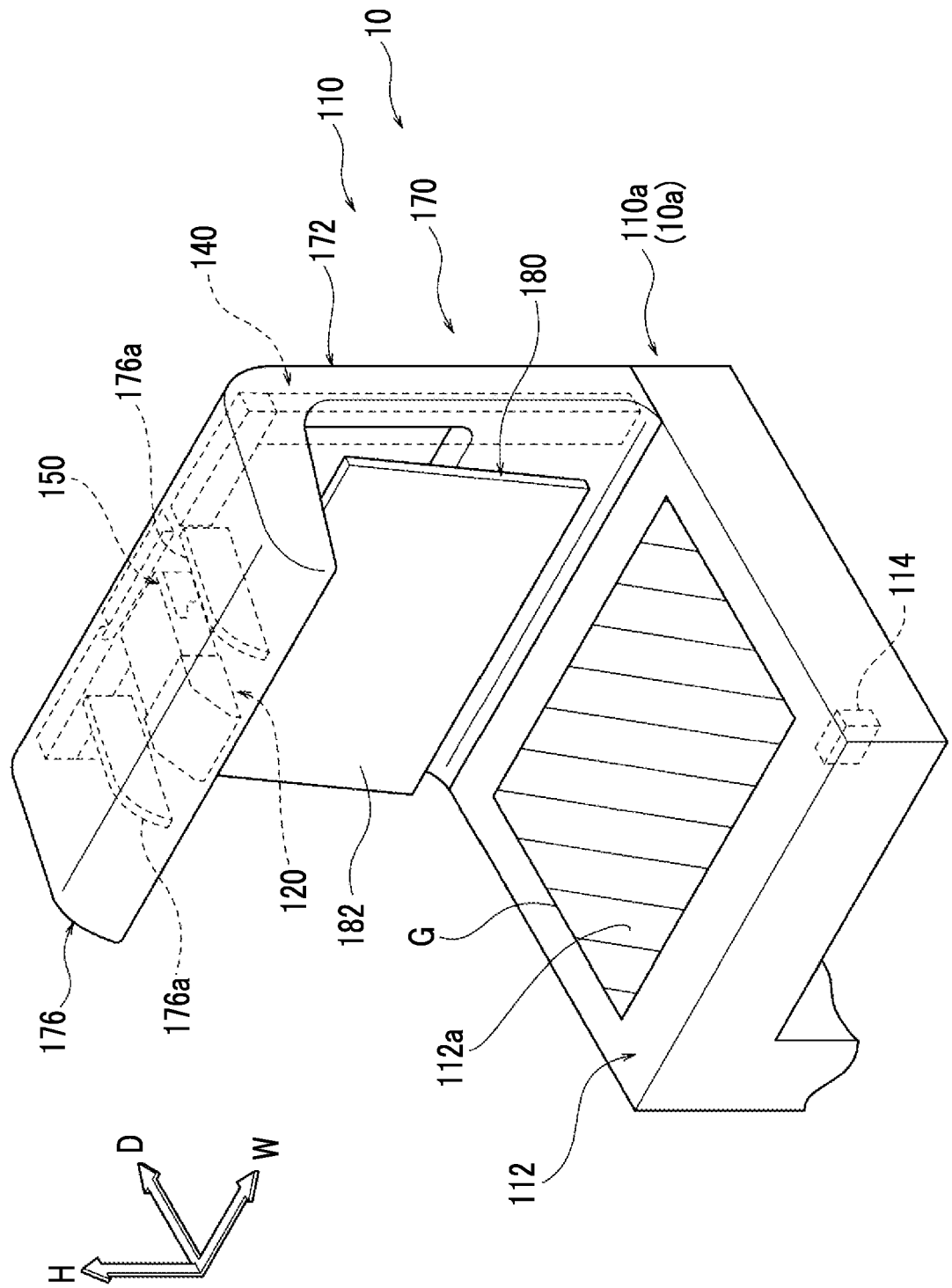
FIG. 3 is a perspective view illustrating an image reading device according to the first exemplary embodiment of the present disclosure.
Figure 4:
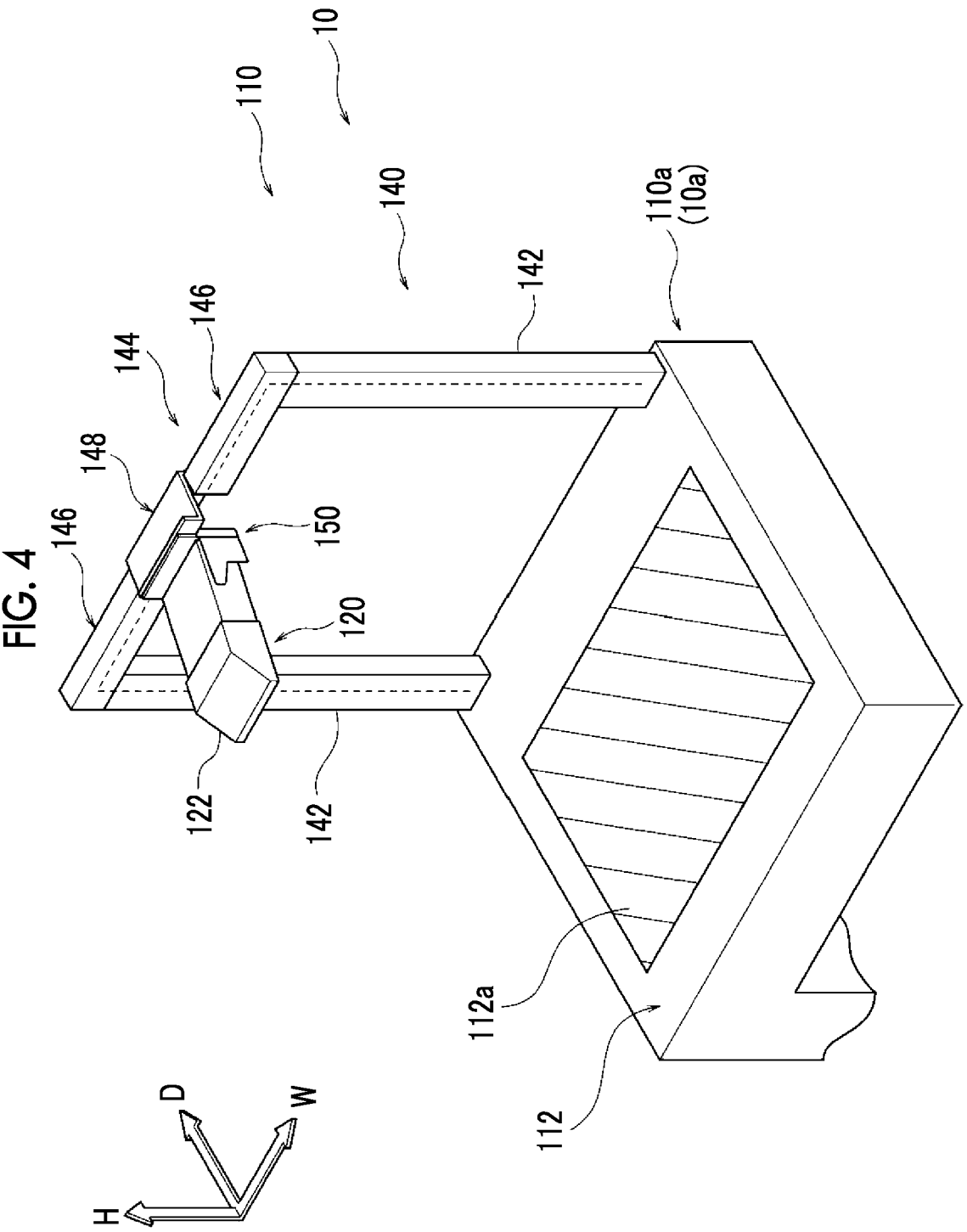
FIG. 4 is a perspective view generally illustrating a support portion of the image reading device according to the first exemplary embodiment of the present disclosure.

Next, the image scanning portion 110 will be described. As illustrated in FIG. 3, the image scanning portion 110 includes a top plate 112 in which a placement surface 112a on which the original document G is placed is formed, and an imaging portion 120 that images the original document G placed on the placement surface 112a. Furthermore, as illustrated in FIG. 4, the image scanning portion 110 includes a support portion 140 that supports the imaging portion 120, and an adjustment portion 150 for adjusting a position of the imaging portion 120. In addition, as illustrated in FIG. 3, the image scanning portion 110 includes a cover 170 that covers the imaging portion 120 and the support portion 140, and a display portion 180 having a display screen 182 on which information related to scanning is displayed. Furthermore, the image scanning portion 110 includes an irradiation unit 190 (refer to FIG. 6) that irradiates the original document G placed on the placement surface 112a with light, and a management portion 114 that manages each portion.

Top Plate 112

As illustrated in FIG. 3, the top plate 112 is provided in an apparatus main body 110a of the image scanning portion 110 and has a plate surface facing upward. The top plate 112 is an example of a placement portion. In the present exemplary embodiment, the apparatus main body 110a is an upper part of the apparatus main body 10a of the image forming apparatus 10.

In addition, the placement surface 112a (hatched part in FIG. 3) on which the original document G of a sheet shape is placed is formed in the top plate 112. In the present exemplary embodiment, as an example, the original document G of maximum A3 size is placed on the placement surface 112a.

Here, the placement surface 112a is a region surface that is a region in which the original document G of a maximum scannable size is placed. In a view from above, the placement surface 112a has a rectangular shape extending in the apparatus width direction and is symmetric about a center of the apparatus main body 110a in the apparatus width direction.

Support Portion 140

As illustrated in FIG. 4, the support portion 140 includes a pair of vertical frames 142 that are both side parts of the apparatus main body 110a in the apparatus width direction standing upward from a far side part of the apparatus main body 110a in the apparatus depth direction. Furthermore, the support portion 140 includes a horizontal frame 144 that extends across upper end portions of the pair of vertical frames 142.

Here, the apparatus depth direction is a direction of approaching to and separating from the user who stands in front of the image scanning portion 110 in order to use the image scanning portion 110. A near side of the apparatus depth direction is a side of approaching to the user. A far side of the apparatus depth direction is a side of separating from the user.

In addition, the apparatus width direction is a leftward and rightward direction of the user who stands in front of the image scanning portion 110 in order to use the image scanning portion 110.

Vertical Frame 142

The pair of vertical frames 142 have the same configuration and are formed using a metal material. As illustrated in FIG. 4, the vertical frame 142 extends in an upward and downward direction and has a tubular shape of a rectangular cross section. In addition, a base end portion of the vertical frame 142 is attached to the apparatus main body 110a.

Horizontal Frame 144

The horizontal frame 144 is formed using a metal material and extends in the apparatus width direction as illustrated in FIG. 4. In addition, the horizontal frame 144 is configured to include a pair of tubular frames 146 and a bracket 148.

The pair of tubular frames 146 are symmetric in the apparatus width direction about a center of the placement surface 112a in the apparatus width direction. A base end portion of each tubular frame 146 is connected to a tip end portion of one vertical frame 142, and a tip end portion of one tubular frame 146 extends toward a tip end portion of the other vertical frame 142. In addition, the tubular frame 146 has a tubular shape of a rectangular cross section, and a hollow portion of the tubular frame 146 is connected to a hollow portion of the vertical frame 142.

Figure 5:
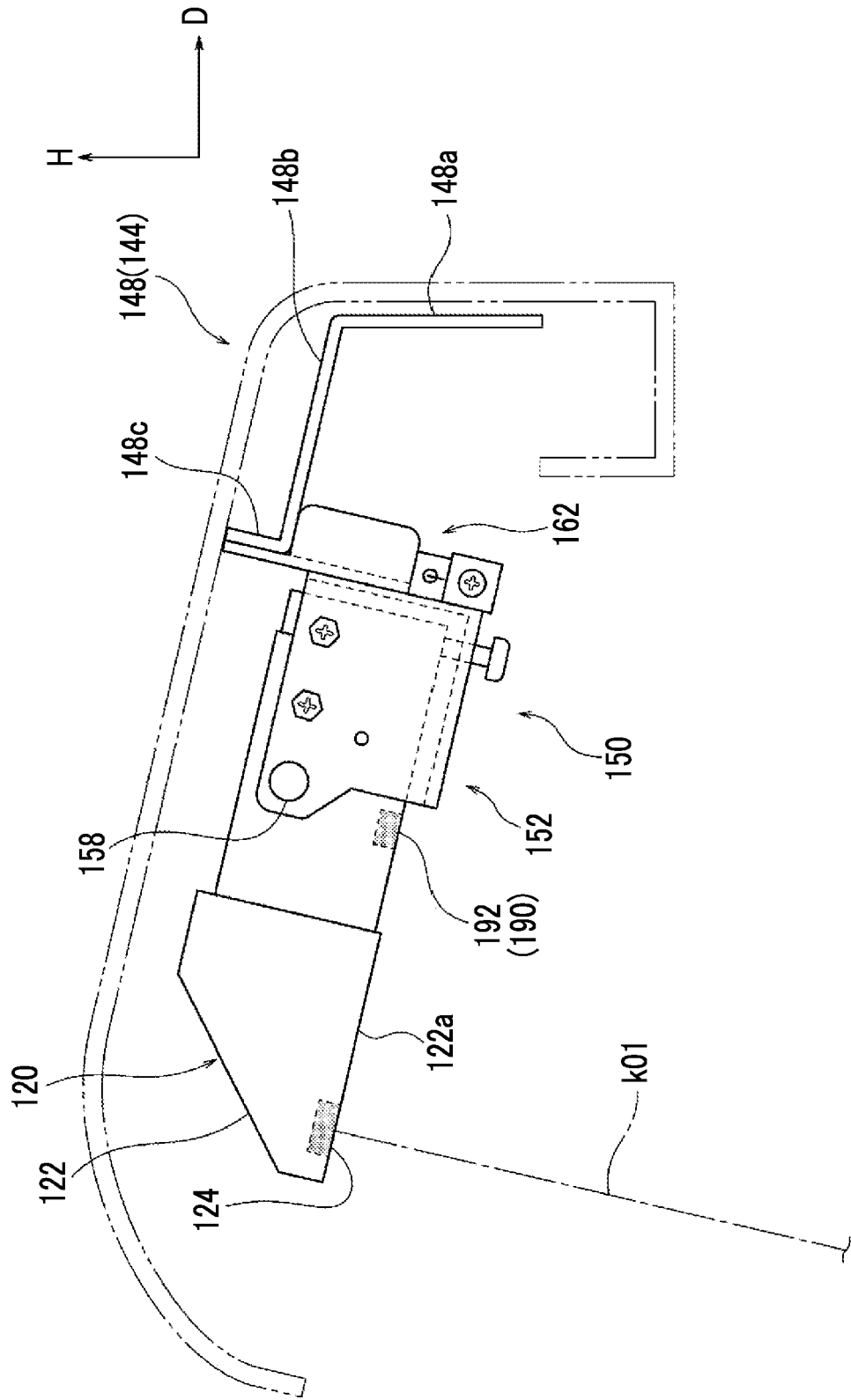
FIG. 5 is a side view illustrating an imaging portion, an adjustment portion, and the like of the image reading device according to the first exemplary embodiment of the present disclosure.

The bracket 148 extends between the tip end portion of one tubular frame 146 and the tip end portion of the other tubular frame 146. As illustrated in FIG. 5, the bracket 148 is formed in a Z shape by bending a plate member and includes a vertical plate 148a of which a plate thickness direction is the apparatus depth direction, and an inclined plate 148b that extends in an inclined manner from a tip end portion of the vertical plate 148a to the near side of the apparatus depth direction. Furthermore, the bracket 148 includes a flange plate 148c that extends upward from a tip end portion of the inclined plate 148b.

Both end portions of the vertical plate 148a in the apparatus width direction are respectively connected to the tip end portions of the pair of tubular frames 146 (refer to FIG. 4).

Imaging Portion 120

Figure 6:
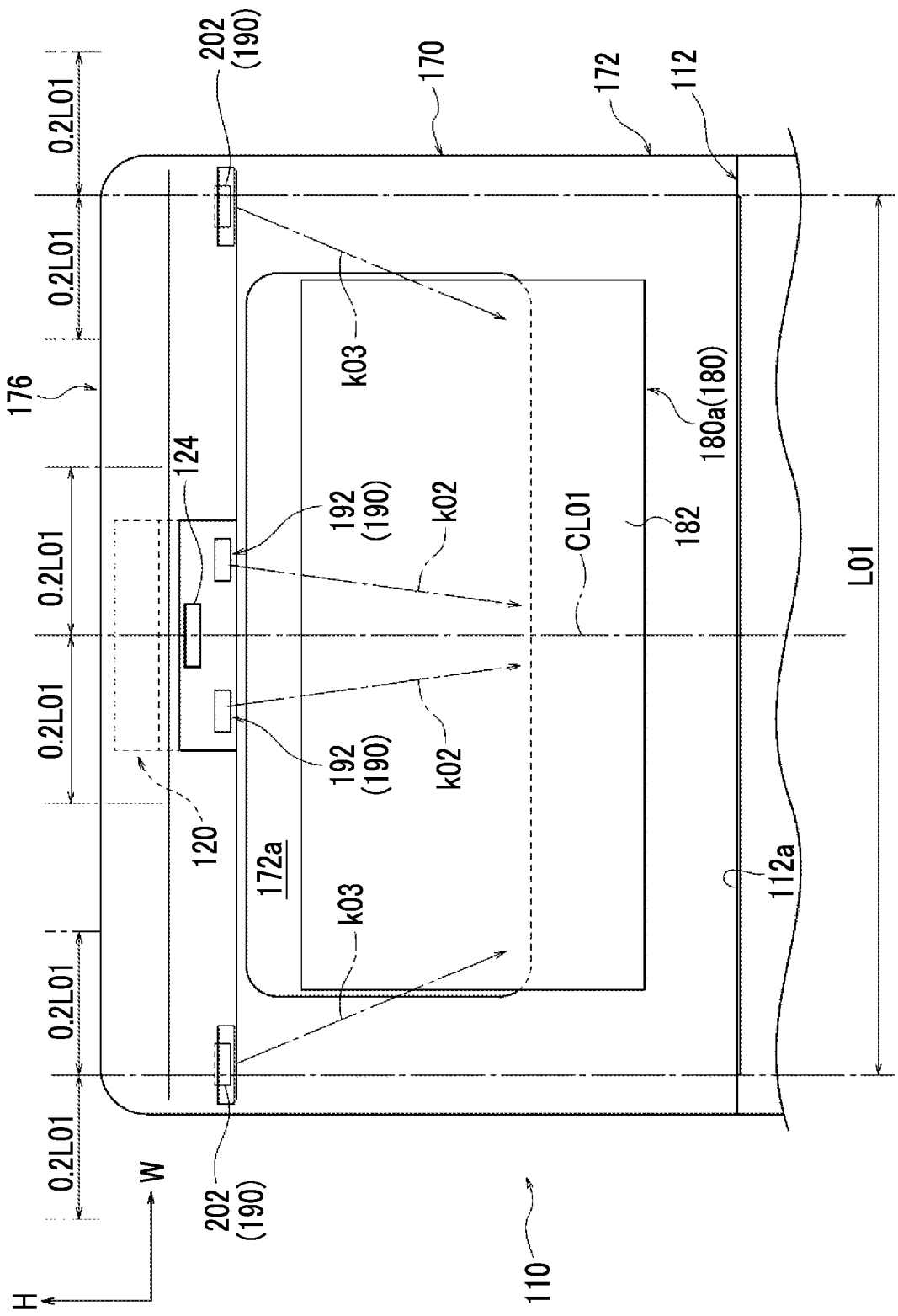
FIG. 6 is a front view illustrating the image reading device according to the first exemplary embodiment of the present disclosure.
Figure 7:
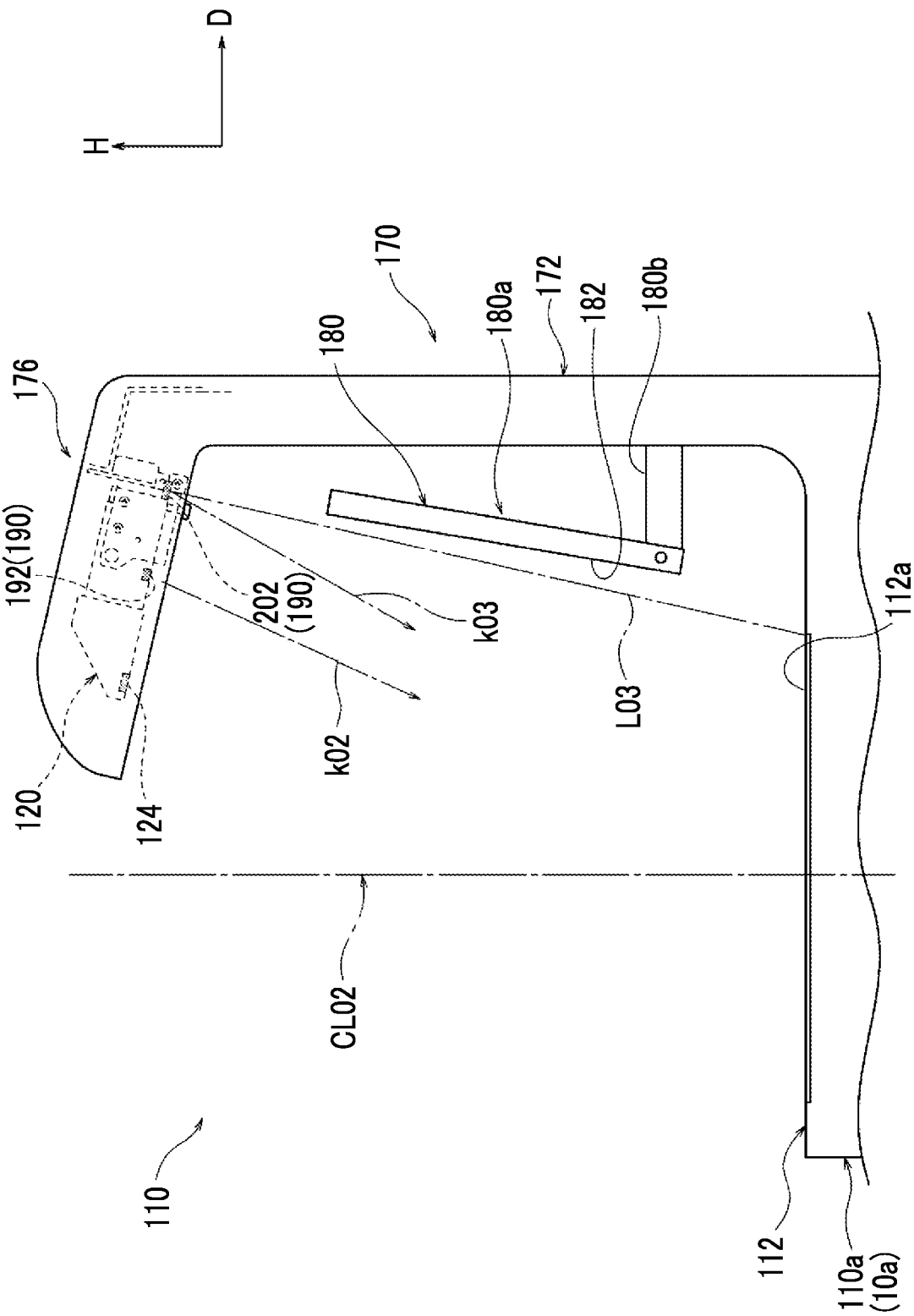
FIG. 7 is a side view illustrating the image reading device according to the first exemplary embodiment of the present disclosure.

As illustrated in FIG. 6 and FIG. 7, the imaging portion 120 is arranged on a far side with respect to a center (refer to CL01 in FIG. 6) of the placement surface 112a in the apparatus width direction and a center (refer to CL02 in FIG. 7) of the placement surface 112a in the apparatus depth direction.

As illustrated in FIG. 4 and FIG. 5, a housing 122 of the imaging portion 120 has a rectangular solid shape that is inclined with respect to the horizontal direction such that the near side of the apparatus depth direction is positioned above the far side in a view from the apparatus width direction, and of which a part on the near side of the apparatus depth direction is chamfered in a view from the apparatus width direction.

In addition, an imaging optical system is provided inside the housing 122, and a window portion 124 for acquiring a captured image inside the image reading portion 110 is formed in a part of a lower surface 122a of the housing 122 on the near side of the apparatus depth direction. The window portion 124 is arranged at the center CL01 (refer to FIG. 6) of the placement surface 112a in the apparatus width direction.

Furthermore, while illustration is not provided, a harness connected to the imaging portion 120 also extends up to the apparatus main body 110a by passing through the tubular frame 146 and the vertical frame 142.

Adjustment Portion 150

As illustrated in FIG. 5, the adjustment portion 150 includes a bracket 152 attached to the imaging portion 120 and a bracket 162 attached to the flange plate 148c of the bracket 148.

A rod 158 that extends in the apparatus width direction and constitutes a shaft portion is provided in the adjustment portion 150. Rotating the imaging portion 120 about the rod 158 as a center moves an optical axis (k01 in FIG. 5) of the imaging optical system of the imaging portion 120 in the apparatus depth direction.

Figure 8:
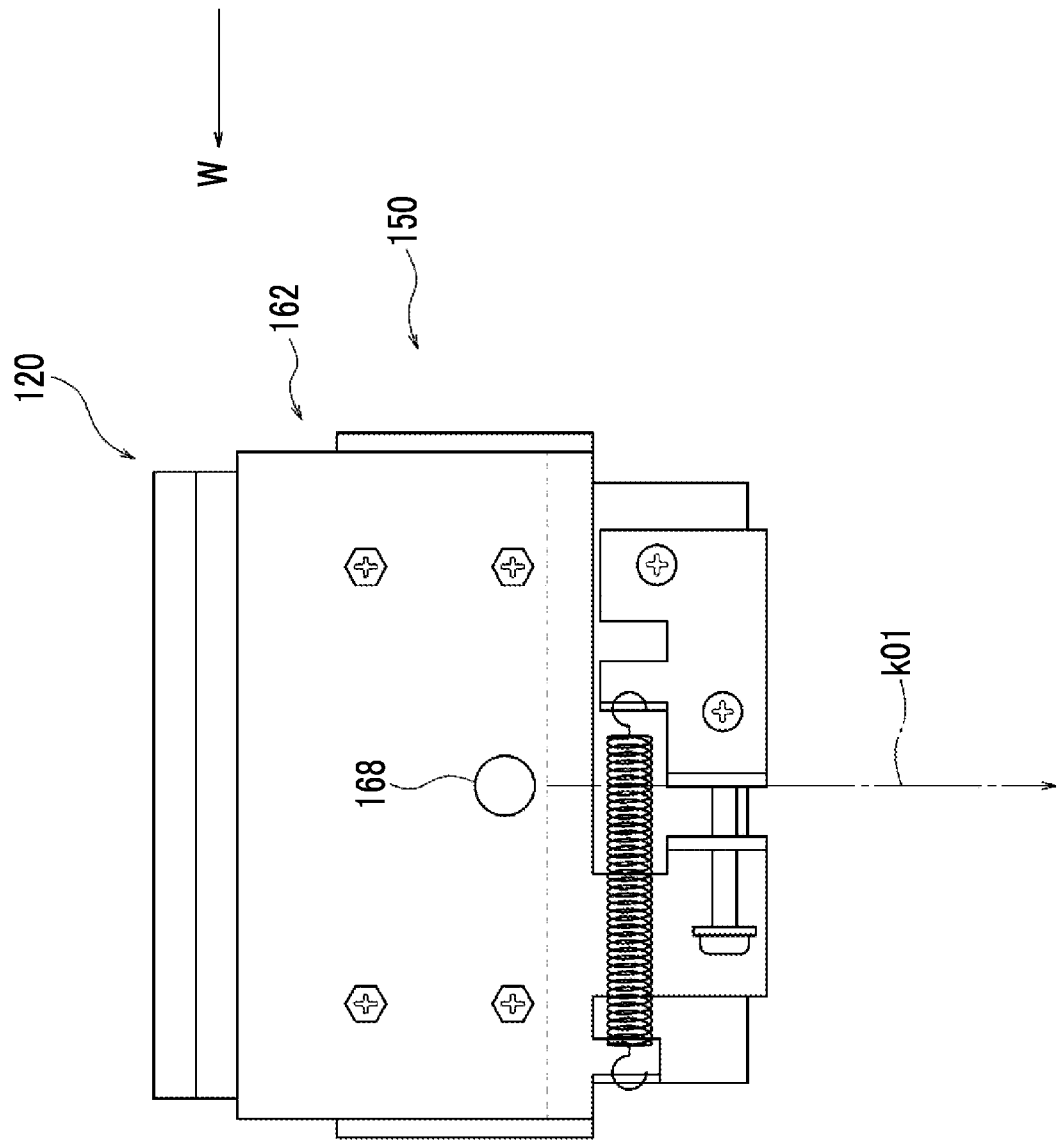
FIG. 8 is a rear view illustrating the adjustment portion of the image reading device according to the first exemplary embodiment of the present disclosure.

Furthermore, in a case where the adjustment portion 150 is viewed from the far side of the apparatus depth direction, a rod 168 that extends in an inclined direction with respect to the apparatus depth direction is provided in the adjustment portion 150 as illustrated in FIG. 8. Rotating the imaging portion 120 about the rod 168 as a center moves the optical axis (k01 in FIG. 8) of the imaging optical system of the imaging portion 120 in the apparatus width direction.

Cover 170

As illustrated in FIG. 3, the cover 170 covers the imaging portion 120, the adjustment portion 150, and the support portion 140. The cover 170 is an example of a covering portion.

The cover 170 is formed using a resin material and has an L shape in a view from the apparatus width direction as illustrated in FIG. 7. Specifically, the cover 170 includes a standing portion 172 that stands upward from the far side part of the apparatus main body 110a in the apparatus depth direction, and an eaves portion 176 that extends to the near side of the apparatus depth direction from an upper end portion of the standing portion 172.

Standing Portion 172

As illustrated in FIG. 3, the standing portion 172 covers the support portion 140 from the near side and the far side of the apparatus depth direction. In addition, as illustrated in FIG. 6, an opening portion 172a that passes through the standing portion 172 in the apparatus depth direction is formed in the standing portion 172 in a view from the apparatus depth direction. Specifically, the opening portion 172a has a rectangular shape that extends in the apparatus width direction in a view from the apparatus depth direction.

Eaves Portion 176

Figure 9:
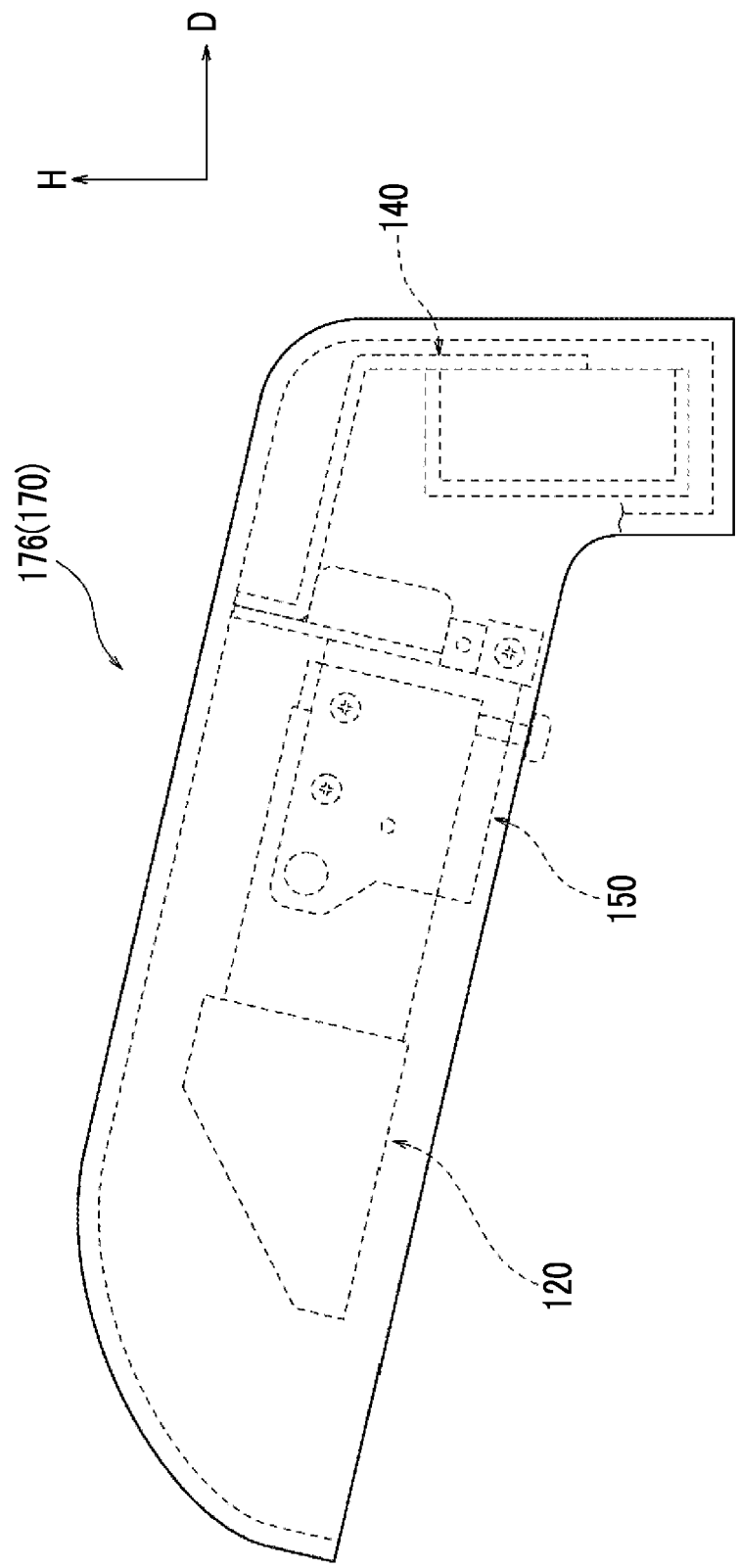
FIG. 9 is a side view illustrating the imaging portion, the adjustment portion, a cover, and the like of the image reading device according to the first exemplary embodiment of the present disclosure.
Figure 10:
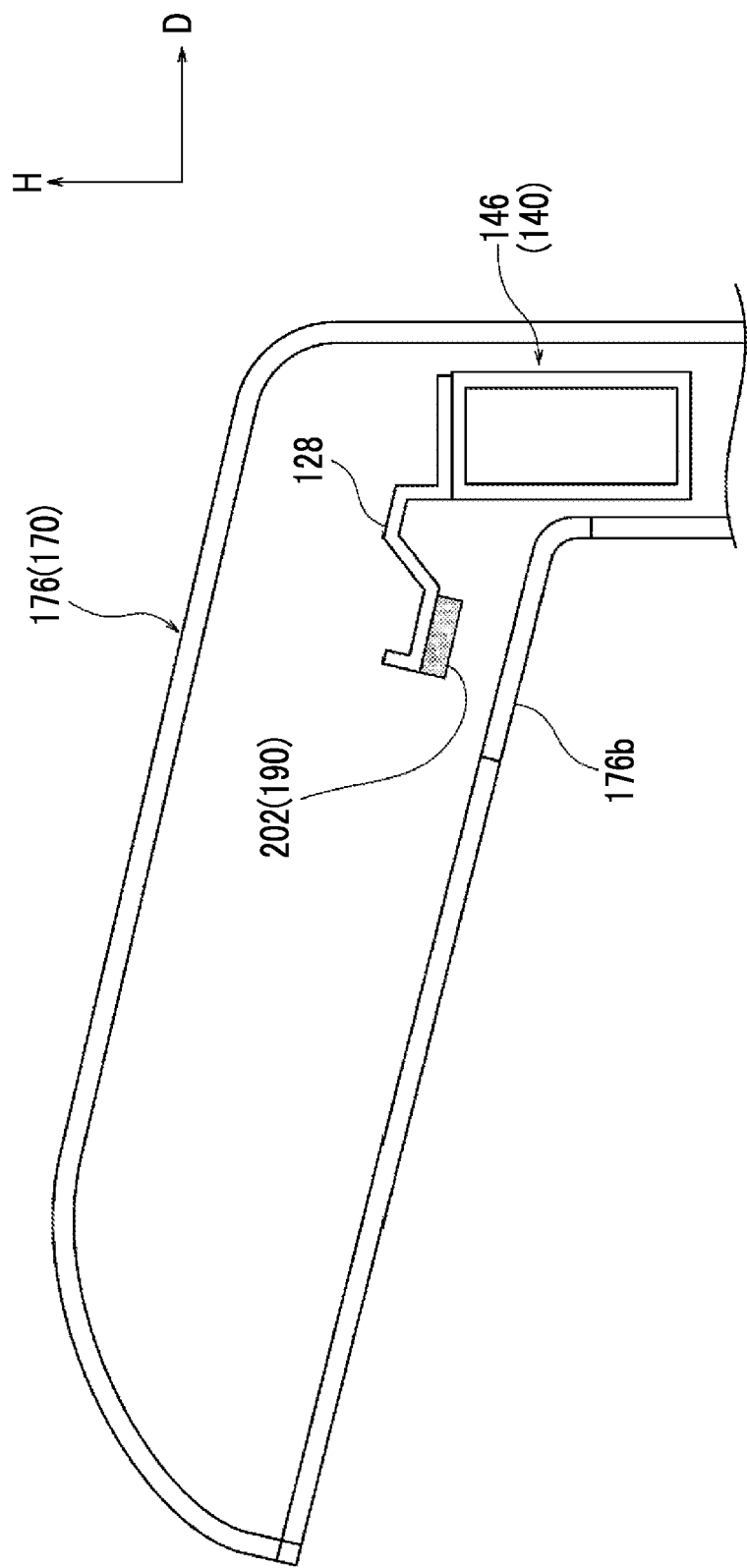
FIG. 10 is a cross-sectional view illustrating the cover, the support portion, and the like of the image reading device according to the first exemplary embodiment of the present disclosure.

As illustrated in FIG. 9, the eaves portion 176 covers the imaging portion 120, the adjustment portion 150, and the support portion 140 (refer to FIG. 4) from an upper side of the apparatus upward and downward direction, the near side of the apparatus depth direction, and the far side of the apparatus depth direction. In addition, as illustrated in FIG. 3, a pair of ribs 176a of a plate shape are formed inside a designed surface in the eaves portion 176 such that the pair of ribs 176a are arranged with the imaging portion 120 interposed between the pair of ribs 176a in the apparatus width direction. The eaves portion 176 of a part outside the rib 176a in the apparatus width direction has a cross section having a hollow inside as illustrated in FIG. 10.

Display Portion 180

As illustrated in FIG. 7, the display portion 180 is arranged between the placement surface 112a and the imaging portion 120 in the apparatus upward and downward direction on the far side of the apparatus depth direction with respect to the placement surface 112a.

As illustrated in FIG. 6 and FIG. 7, the display portion 180 includes a main body portion 180a of a plate shape and a support portion 180b that rotatably supports the main body portion 180a. The main body portion 180a has a rectangular plate shape extending in the apparatus width direction and is arranged such that a plate surface faces above the near side of the apparatus depth direction in an inclined manner. The display screen 182 on which information related to scanning is displayed using a liquid crystal is provided in the main body portion 180a.

At least a part of the display screen 182 is arranged on a center side of the placement surface 112a in the apparatus width direction, and the display screen 182 is symmetric about the center of the placement surface 112a in the apparatus width direction.

In this configuration, in a case where the user places the original document G on the placement surface 112a and provides an instruction to scan the original document G from the display screen 182, the original document G is imaged by the imaging portion 120. Accordingly, the image scanning portion 110 scans the original document G.

Irradiation Unit 190

As illustrated in FIG. 6, the irradiation unit 190 includes a pair of irradiation portions 192 arranged on both sides of the window portion 124 in the apparatus width direction and a pair of irradiation portions 202 arranged on both sides of the irradiation portion 192 in the apparatus width direction. The irradiation portion 202 is an example of other irradiation portions.

Irradiation Portion 192

The irradiation portion 192 is an LED illumination in the present exemplary embodiment and is attached to the lower surface 122a of the housing 122 of the imaging portion 120 as illustrated in FIG. 5. The pair of irradiation portions 192 provided have the same performance as each other and, as illustrated in FIG. 6, are arranged on the center side of the placement surface 112a in the apparatus width direction symmetrically about the window portion 124 in the apparatus width direction. In other words, the pair of irradiation portions 192 are arranged on the center side of the placement surface 112a in the apparatus width direction symmetrically about the optical axis of the imaging optical system of a captured image in the apparatus width direction. Here, the same performance means a case where irradiance of one is within ±10 [%] of irradiance of the other, and the irradiance of the other is within ±10 [%] of the irradiance of the one.

Here, as illustrated in FIG. 6, in a case where a length of the placement surface 112a in the apparatus width direction is denoted by L01, the center side of the placement surface 112a is a region from the center of the placement surface 112a to 0.2×L01 on one side in the apparatus width direction or a region from the center of the placement surface 112a to 0.2×L01 on the other side in the apparatus width direction.

In addition, as illustrated in FIG. 7, the pair of irradiation portions 192 are arranged on the far side from the center of the placement surface 112a in the apparatus depth direction and the far side of the window portion 124 in the apparatus depth direction.

In addition, in a view from the apparatus depth direction, an optical axis k02 of the pair of irradiation portions 192 is directed toward the center of the placement surface 112a in the apparatus width direction as illustrated in FIG. 6 as an example. Furthermore, in a view from the apparatus width direction, the optical axis k02 of the pair of irradiation portions 192 is directed toward the center of the placement surface 112a in the apparatus depth direction as illustrated in FIG. 7 as an example.

Irradiation Portion 202

The irradiation portion 202 is an LED illumination in the present exemplary embodiment and is attached to the tubular frame 146 of the support portion 140 via a bracket 128 as illustrated in FIG. 10. In addition, the irradiation portion 202 is arranged inside the eaves portion 176 of the cover 170, and a part 176b of the eaves portion 176 through which light emitted from the irradiation portion 202 passes is formed of a transparent resin material.

The pair of irradiation portions 202 provided have the same performance as each other and, as illustrated in FIG. 6, are arranged on an end portion side of the placement surface 112a in the apparatus width direction symmetrically about the window portion 124 in the apparatus width direction.

Here, as illustrated in FIG. 6, in a case where the length of the placement surface 112a in the apparatus width direction is denoted by L01, the end portion side of the placement surface 112a is a region from an end portion of the placement surface 112a to 0.2×L01 on one side in the apparatus width direction or a region from an end portion of the placement surface 112a to 0.2×L01 on the other side in the apparatus width direction.

In addition, as illustrated in FIG. 7 and FIG. 11, the pair of irradiation portions 202 are arranged on the far side of the irradiation portion 192 in the apparatus depth direction. Furthermore, the pair of irradiation portions 202 are arranged on the far side of the apparatus depth direction with respect to the end portion of the placement surface 112a on the far side of the apparatus depth direction.

In addition, in a view from the apparatus depth direction, an optical axis k03 of the pair of irradiation portions 202 is directed toward a middle part between the center and the end portion of the placement surface 112a in the apparatus width direction as illustrated in FIG. 6 as an example. Furthermore, in a view from the apparatus width direction, the optical axis k03 of the pair of irradiation portions 202 is directed toward the center of the placement surface 112a in the apparatus depth direction as illustrated in FIG. 7 as an example.

In addition, in a view from the apparatus width direction, the display portion 180 is arranged on the far side of the apparatus depth direction with respect to straight line L03 that connects the irradiation portion 202 to the end portion of the placement surface 112a on the far side of the apparatus depth direction. Specifically, the display portion 180 is arranged on the far side of the apparatus depth direction with respect to straight line L03 even in a case where an inclination angle of the main body portion 180a of the display portion 180 is changed.

Conclusion

As described above, in the image scanning portion 110, the pair of irradiation portions 202 are arranged on both sides of the irradiation portion 192 in the apparatus width direction. With this configuration, brightness unevenness occurring in the original document G because of overlapping between the light of the irradiation portion 192 and the light of the display screen 182 of the display portion 180 is reduced by light from the irradiation portion 202. That is, the brightness unevenness occurring in the original document G because of overlapping between the light of the irradiation portion 192 and the light of the display screen 182 is suppressed, compared to a configuration in which only one irradiation portion is arranged close to the imaging portion.

In addition, in the image scanning portion 110, the pair of irradiation portions 192 are provided with the optical axis k01 of the imaging optical system of the image captured by the imaging portion 120 interposed between the pair of irradiation portions 192 in the apparatus width direction. With this configuration, a light quantity of one irradiation portion 192 can be reduced, compared to a case where there is only one irradiation portion. Accordingly, reflection disruption that appears in the captured image because of reflection of the light from the irradiation portion 192 by the original document G is reduced, compared to a case where there is only one irradiation portion.

In addition, in the image scanning portion 110, the pair of irradiation portions 192 are arranged on the center side of the placement surface 112a with the center of the placement surface 112a interposed between the pair of irradiation portions 192 in the apparatus width direction. Accordingly, a light quantity of light with which the original document G is irradiated from the irradiation portion 192 is the same on one side and the other side of the apparatus width direction, compared to a case where the pair of irradiation portions are arranged on the center side and the end portion side of the placement surface with the center of the placement surface interposed between the pair of irradiation portions.

In addition, in the image scanning portion 110, the pair of irradiation portions 202 are arranged on the end portion side of the placement surface 112a in the apparatus width direction. Accordingly, brightness unevenness that occurs because of weakening of the light of the irradiation portion 192 in the end portion of the placement surface 112a in the apparatus width direction is suppressed, compared to a case where the irradiation portion 202 is arranged on the center side of the placement surface 112a in the apparatus width direction.

In addition, in the image scanning portion 110, the irradiation portion 192 is arranged on the far side of the apparatus depth direction with respect to the center of the placement surface 112a in the apparatus depth direction, and the irradiation portion 202 is arranged on the far side of the apparatus depth direction with respect to the irradiation portion 192. With this configuration, the reflection disruption that occurs because of the irradiation portion 192 is reduced by irradiating the placement surface 112a with light by the irradiation portion 202 from the far side of the apparatus depth direction with respect to the irradiation portion 192. That is, the reflection disruption that appears in the captured image because of reflection of the light of irradiation from the irradiation portion 192 by the original document G is reduced, compared to a case where the irradiation portion 202 is arranged at the same position as the irradiation portion 192 in the apparatus depth direction.

In addition, in the image scanning portion 110, the irradiation portions 192 and 202 are arranged inside the cover 170. Accordingly, a simple exterior is achieved, compared to a case where the irradiation portion protrudes from the cover.

In addition, in the image forming apparatus 10, brightness unevenness occurring in the formed image is suppressed, compared to a case where an image scanning portion in which only one irradiation portion is arranged close to the imaging portion is provided.

Second Exemplary Embodiment

Next, an example of an image scanning portion and an image forming apparatus according to a second exemplary embodiment of the present disclosure will be described in accordance with FIGS. 12A and 12B and FIG. 13. In the second exemplary embodiment, different parts from the first exemplary embodiment will be generally described. First, a management portion 214 of an image scanning portion 210 of the second exemplary embodiment will be described.

General Configuration

Hardware Configuration of Management Portion 214

Figure 12B:
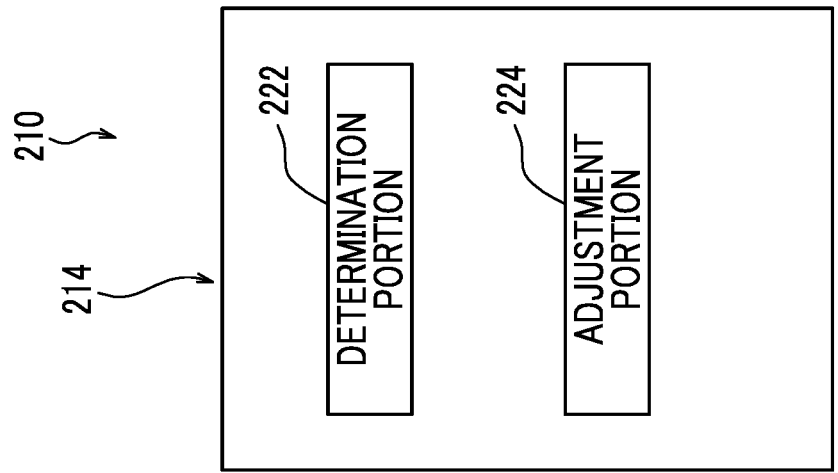
FIGS. 12A and 12B are block diagrams illustrating a management portion of an image reading device according to a second exemplary embodiment of the present disclosure.
Figure 12A:
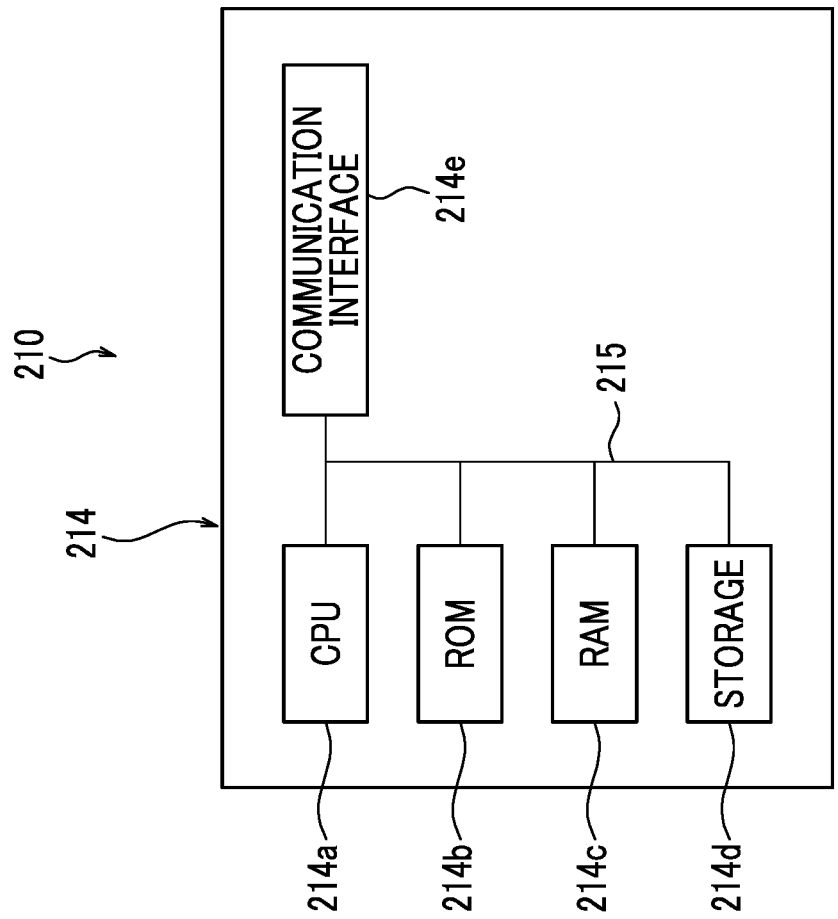

As illustrated in FIG. 12A, the management portion 214 includes a central processing unit (CPU) 214a, a read only memory (ROM) 214b, a random access memory (RAM) 214c, a storage 214d, and a communication interface (I/F) 214e. These configurations are communicably connected to each other via a bus 215.

The CPU 214a is a central calculation processing unit and executes various programs or controls each portion. That is, the CPU 214a reads a program from the ROM 214b or the storage 214d and executes the program using the RAM 214c as a work region. The CPU 214a controls each configuration and performs various calculation processes in accordance with the program recorded in the ROM 214b or the storage 214d.

In the present exemplary embodiment, the ROM 214b or the storage 214d stores a control program or the like for controlling a light quantity of the irradiation portion 192 and a light quantity of the irradiation portion 202.

The ROM 214b stores various programs and various data. The RAM 214c temporarily stores a program or data as the work region. The storage 214d is configured with a hard disk drive (HDD) or a solid state drive (SSD) and stores various programs including an operating system and various data. The communication interface 214e is an interface for the management portion 214 to communicate with each portion.

In a case of executing a management program described above, the management portion 214 implements various functions using hardware resources described above. Functional configurations implemented by the management portion 214 will be described.

Functional Configuration of Management Portion 214

As illustrated in FIG. 12B, the management portion 214 includes a determination portion 222 that determines whether or not the reflection disruption appearing in the captured image because of reflection of the light of irradiation from the irradiation unit 190 by the original document G is present, and an adjustment portion 224 that, in a case where the determination portion 222 determines that the reflection disruption is present, adjusts the light quantity from the irradiation portion 202 to be greater than the light quantity from the irradiation portion 192.

Action of General Configuration

Next, an action of a general configuration will be described using the flowchart illustrated in FIG. 13. Specifically, a step of determining whether or not the reflection disruption is present by imaging a determination sheet S01 used for determining the reflection disruption, and adjusting the light quantities of the irradiation portion 192 and the irradiation portion 202 will be described.

In a case where the user places the determination sheet S01 on the placement surface 112a of the image scanning portion 110 and provides an instruction to perform determination scanning (so-called pre-scanning) for determining whether or not the reflection disruption is present from the display screen 182, a transition is made to step S100.

In step S100, the irradiation portion 192 and the irradiation portion 202 irradiate the determination sheet S01 with light having predetermined light quantities, and the imaging portion 120 captures an image. In a case where the imaging portion 120 captures the image of the determination sheet S01, a transition is made to step S200. In the present exemplary embodiment, as an example, the predetermined light quantities of the irradiation portion 192 and the irradiation portion 202 are the same light quantity between the irradiation portion 192 and the irradiation portion 202.

In step S200, the determination portion 222 receives the image and determines whether or not the reflection disruption is present. In a case where the reflection disruption is determined as being present, a transition is made to step S300. In a case where the reflection disruption is determined as not being present, a transition is made to step S310.

In step S300, in a case where main scanning of scanning the original document G (so-called main scanning) is performed, the adjustment portion 224 adjusts the light quantity from the irradiation portion 202 to be greater than the light quantity from the irradiation portion 192. The determination portion 222 displays the presence of the reflection disruption and the adjustment of the light quantities of the irradiation portions 192 and 202 on the display screen 182, and a series of operations are finished. The main scanning of scanning the original document G is prepared.

On the other hand, in step S310, the determination portion 222 displays the absence of the reflection disruption on the display screen 182, and the series of operations are finished. The main scanning of scanning the original document G is prepared.

Conclusion

As described above, in the image scanning portion 210, in a case where the reflection disruption is determined as being present, the light quantity from the irradiation portion 202 is adjusted to be greater than the light quantity from the irradiation portion 192. Thus, in a case where the reflection disruption is determined as being present, the reflection disruption is suppressed, compared to a case where the light quantities of the irradiation portion 202 and the irradiation portion 192 are the same quantity.

Third Exemplary Embodiment

Next, an example of an image scanning portion and an image forming apparatus according to a third exemplary embodiment of the present disclosure will be described in accordance with FIGS. 14A and 14B and FIG. 15. In the third exemplary embodiment, different parts from the first exemplary embodiment will be generally described. First, a management portion 314 of an image scanning portion 310 of the third exemplary embodiment will be described.

General Configuration

Hardware Configuration of Management Portion 314

Figure 14B:
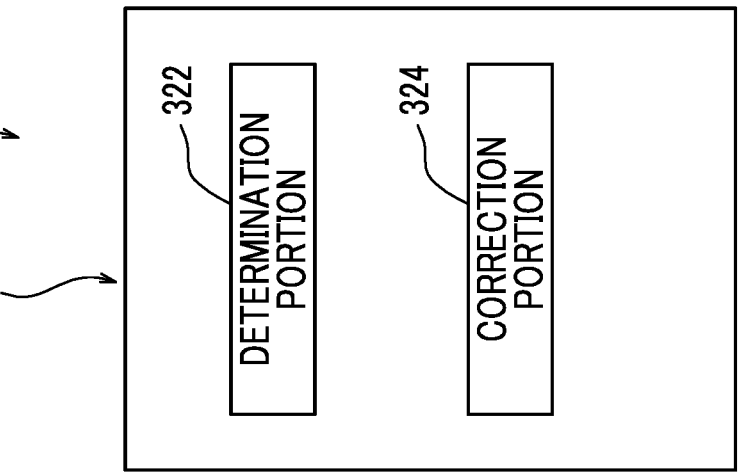
FIGS. 14A and 14B are block diagrams illustrating a management portion of an image reading device according to a third exemplary embodiment of the present disclosure.
Figure 14A:
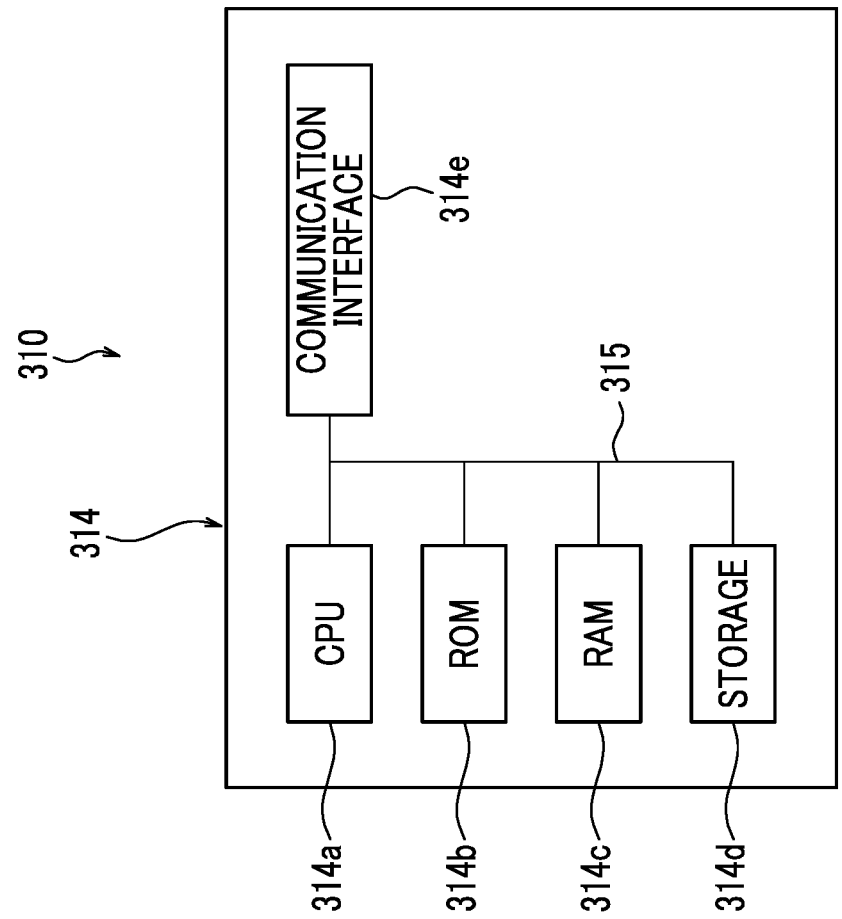

As illustrated in FIG. 14A, the management portion 314 includes a central processing unit (CPU) 314a, a read only memory (ROM) 314b, a random access memory (RAM) 314c, a storage 314d, and a communication interface (I/F) 314e. These configurations are communicably connected to each other via a bus 315.

The CPU 314a is a central calculation processing unit and executes various programs or controls each portion. That is, the CPU 314a reads a program from the ROM 314b or the storage 314d and executes the program using the RAM 314c as a work region. The CPU 314a controls each configuration and performs various calculation processes in accordance with the program recorded in the ROM 314b or the storage 314d.

In the present exemplary embodiment, the ROM 314b or the storage 314d stores a control program or the like for controlling a light quantity of the display screen 182.

The ROM 314b stores various programs and various data. The RAM 314c temporarily stores a program or data as the work region. The storage 314d is configured with a hard disk drive (HDD) or a solid state drive (SSD) and stores various programs including an operating system and various data. The communication interface 314e is an interface for the management portion 314 to communicate with each portion.

In a case of executing the management program described above, the management portion 314 implements various functions using the hardware resources described above. Functional configurations implemented by the management portion 314 will be described.

Functional Configuration of Management Portion 314

As illustrated in FIG. 14B, the management portion 314 includes a determination portion 322 that determines whether or not the brightness unevenness occurring in the original document G is present. Furthermore, the management portion 314 includes a correction portion 324 that, in a case where the determination portion 322 determines that the brightness unevenness is present, corrects the light quantity of the display screen 182 in the imaging of the original document G by the imaging portion 120 to be smaller than the light quantity of the display screen 182 when a scanning instruction is input. The determination portion 322 is an example of another determination portion.

Action of General Configuration

Next, an action of a general configuration will be described using the flowchart illustrated in FIG. 15. Specifically, a step of determining whether or not the brightness unevenness is present by imaging a determination sheet S02 used for determining the brightness unevenness, and correcting the light quantity of the display screen 182 will be described.

In a case where the user places the determination sheet S02 on the placement surface 112a of the image scanning portion 110 and provides an instruction to perform determination scanning (so-called pre-scanning) for determining whether or not the brightness unevenness occurring in the original document G is present, a transition is made to step S1100.

In step S1100, the irradiation portion 192 and the irradiation portion 202 irradiate the determination sheet S02 with light having predetermined light quantities, and the imaging portion 120 captures an image. In a case where the imaging portion 120 captures the image, a transition is made to step S1200. In the present exemplary embodiment, as an example, the predetermined light quantities of the irradiation portion 192 and the irradiation portion 202 are the same light quantity between the irradiation portion 192 and the irradiation portion 202.

In step S1200, the determination portion 322 receives the image and determines whether or not the brightness unevenness is present. In a case where the brightness unevenness is determined as being present, a transition is made to step S1300. In a case where the brightness unevenness is determined as not being present, a transition is made to step S1310.

In step S1300, the correction portion 324 corrects the light quantity of the display screen 182 in the imaging of the original document G by the imaging portion 120 to be smaller than the light quantity of the display screen 182 when the scanning instruction is input. The determination portion 322 displays the presence of the brightness unevenness and the correction of the light quantity of the display screen 182 on the display screen 182, and a series of operations are finished. The main scanning of scanning the original document G is prepared.

On the other hand, in step S1310, the determination portion 322 displays the absence of the brightness unevenness on the display screen 182, and the series of operations are finished. The main scanning of scanning the original document G is prepared.

Conclusion

As described above, in the image scanning portion 310, in a case where the brightness unevenness is determined as being present, the light quantity of the display screen 182 in the imaging of the original document G by the imaging portion 120 is corrected to be smaller than the light quantity of the display screen 182 when the scanning instruction is input. Thus, in a case where the brightness unevenness is determined as being present, the brightness unevenness is suppressed, compared to a case where the light quantity of the display screen in the imaging of the original document by the imaging portion is the same as the light quantity of the display screen when the scanning instruction is input.

While the present disclosure is described in detail with respect to a specific exemplary embodiment, the present disclosure is not limited to such an exemplary embodiment. A person skilled in the art will perceive that other various exemplary embodiments can be made to the present disclosure within the scope of the present disclosure. For example, in the exemplary embodiments, while the pair of irradiation portions 192 are provided, only one irradiation portion 192 may be provided. In this case, an effect achieved by providing the pair of irradiation portions 192 is not achieved.

In addition, in the exemplary embodiments, while the irradiation portion 202 is arranged on the end portion side of the placement surface 112*a*, the irradiation portion 202 may be closer to the center of the placement surface 112*a* than the end portion side. In this case, an effect achieved by arranging the irradiation portion 202 on the end portion side of the placement surface 112*a* is not achieved.

In addition, in the exemplary embodiments, while the irradiation portion 202 is arranged on the far side of the apparatus depth direction with respect to the irradiation portion 192, the irradiation portion 202 may be arranged on the near side of the apparatus depth direction with respect to the irradiation portion 192. In this case, an effect achieved by arranging the irradiation portion 202 on the far side of the apparatus depth direction with respect to the irradiation portion 192 is not achieved.

In addition, in the exemplary embodiments, while the irradiation portions 192 and 202 are LED illuminations, the irradiation portions 192 and 202 may be, for example, fluorescent lamps.

In addition, in the third exemplary embodiment, while the light quantity of the display screen 182 in the imaging of the original document G by the imaging portion 120 is corrected to be smaller than the light quantity of the display screen 182 when the scanning instruction is input, the light quantity of the display screen 182 may be set to 0. Accordingly, the brightness unevenness is suppressed, compared to a case where the light quantity of the display screen 182 is not zero (a case where the display screen 182 is lit).

In addition, in the third exemplary embodiment, while the light quantity of the display screen 182 is corrected by determining whether or not the brightness unevenness is present, the light quantity of the display screen 182 in the imaging of the original document G by the imaging portion 120 may be corrected to be smaller than the light quantity of the display screen 182 when the scanning instruction is input, without determining whether or not the brightness unevenness is present.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image reading device comprising:
   a placement portion in which a placement surface on which an original document is placed is formed;
   an imaging portion that is arranged on a center side of the placement surface in an apparatus width direction above the placement surface in an apparatus upward and downward direction and images the original document;
   a display portion having a display screen of which at least a part is arranged on a far side of the placement surface in an apparatus depth direction and the center side of the placement surface in the apparatus width direction between the placement surface and the imaging portion in the apparatus upward and downward direction;
   an irradiation portion that is arranged on the center side of the placement surface in the apparatus width direction above the display portion in the apparatus upward and downward direction and irradiates the placement surface with light; and
   a pair of other irradiation portions that are respectively arranged on both sides of the irradiation portion in the apparatus width direction above the display portion in the apparatus upward and downward direction and irradiate the placement surface with light, wherein an optical axis of the pair of other irradiation portions is directed toward the center side of the placement surface in the apparatus width direction.

2. The image reading device according to claim 1, wherein a pair of the irradiation portions are provided with an optical axis of an imaging optical system of an image captured by the imaging portion interposed between the pair of irradiation portions in the apparatus width direction.

3. The image reading device according to claim 2, wherein the pair of irradiation portions have the same performance and are arranged on the center side of the placement surface with a center of the placement surface interposed between the pair of irradiation portions in the apparatus width direction.

4. The image reading device according to claim 3, wherein the pair of other irradiation portions are arranged on an end portion side of the placement surface with a center of the placement surface interposed between the pair of other irradiation portions in the apparatus width direction.

5. The image reading device according to claim 4, wherein a window portion for acquiring an image captured in the imaging portion inside the image reading device is arranged on a far side of the apparatus depth direction with respect to a center of the placement surface, the irradiation portion is arranged on a far side of the apparatus depth direction with respect to the window portion, and the pair of other irradiation portions are arranged on a far side of the apparatus depth direction with respect to the irradiation portion.

6. The image reading device according to claim 3, wherein a window portion for acquiring an image captured in the imaging portion inside the image reading device is arranged on a far side of the apparatus depth direction with respect to a center of the placement surface, the irradiation portion is arranged on a far side of the apparatus depth direction with respect to the window portion, and the pair of other irradiation portions are arranged on a far side of the apparatus depth direction with respect to the irradiation portion.

7. The image reading device according to claim 6, further comprising:

a determination portion that determines whether or not reflection disruption appearing in the captured image because of reflection of light from the original document is present; and an adjustment portion that, in a case where the determination portion determines that the reflection disruption is present, adjusts a light quantity from the other irradiation portion to be greater than a light quantity from the irradiation portion.

8. The image reading device according to claim 2, wherein a window portion for acquiring an image captured in the imaging portion inside the image reading device is arranged on a far side of the apparatus depth direction with respect to a center of the placement surface, the irradiation portion is arranged on a far side of the apparatus depth direction with respect to the window portion, and the pair of other irradiation portions are arranged on a far side of the apparatus depth direction with respect to the irradiation portion.

9. The image reading device according to claim 8, further comprising:

a determination portion that determines whether or not reflection disruption appearing in the captured image because of reflection of light from the original document is present; and an adjustment portion that, in a case where the determination portion determines that the reflection disruption is present, adjusts a light quantity from the other irradiation portion to be greater than a light quantity from the irradiation portion.

10. The image reading device according to claim 2, wherein the pair of other irradiation portions are arranged on an end portion side of the placement surface with a center of the placement surface interposed between the pair of other irradiation portions in the apparatus width direction.

11. The image reading device according to claim 10, wherein a window portion for acquiring an image captured in the imaging portion inside the image reading device is arranged on a far side of the apparatus depth direction with respect to a center of the placement surface, the irradiation portion is arranged on a far side of the apparatus depth direction with respect to the window portion, and the pair of other irradiation portions are arranged on a far side of the apparatus depth direction with respect to the irradiation portion.

12. The image reading device according to claim 11, further comprising:

a determination portion that determines whether or not reflection disruption appearing in the captured image because of reflection of light from the original document is present; and an adjustment portion that, in a case where the determination portion determines that the reflection disruption is present, adjusts a light quantity from the other irradiation portion to be greater than a light quantity from the irradiation portion.

13. The image reading device according to claim 1, wherein the pair of other irradiation portions are arranged on an end portion side of the placement surface with a center of the placement surface interposed between the pair of other irradiation portions in the apparatus width direction.

14. The image reading device according to claim 13, wherein a window portion for acquiring an image captured in the imaging portion inside the image reading device is arranged on a far side of the apparatus depth direction with respect to a center of the placement surface, the irradiation portion is arranged on a far side of the apparatus depth direction with respect to the window portion, and the pair of other irradiation portions are arranged on a far side of the apparatus depth direction with respect to the irradiation portion.

15. The image reading device according to claim 14, further comprising:

a determination portion that determines whether or not reflection disruption appearing in the captured image because of reflection of light from the original document is present; and an adjustment portion that, in a case where the determination portion determines that the reflection disruption is present, adjusts a light quantity from the other irradiation portion to be greater than a light quantity from the irradiation portion.

16. The image reading device according to claim 1, wherein a window portion for acquiring an image captured in the imaging portion inside the image reading device is arranged on a far side of the apparatus depth direction with respect to a center of the placement surface, the irradiation portion is arranged on a far side of the apparatus depth direction with respect to the window portion, and the pair of other irradiation portions are arranged on a far side of the apparatus depth direction with respect to the irradiation portion.

17. The image reading device according to claim 16, further comprising:

a determination portion that determines whether or not reflection disruption appearing in the captured image because of reflection of light from the original document is present; and an adjustment portion that, in a case where the determination portion determines that the reflection disruption is present, adjusts a light quantity from the other irradiation portion to be greater than a light quantity from the irradiation portion.

18. The image reading device according to claim 1, wherein a screen on which a scanning instruction is input is displayed on the display screen of the display portion, and the image reading device further includes another determination portion that determines whether or not brightness unevenness occurring in the original document is present, and a correction portion that, in a case where the other determination portion determines that the brightness unevenness is present, corrects a light quantity of the display screen in the imaging of the original document by the imaging portion to be smaller than a light quantity of the display screen when the scanning instruction is input.

19. The image reading device according to claim 18, wherein in a case where the other determination portion determines that the brightness unevenness is present, the light quantity of the display screen in the imaging of the original document by the imaging portion is set to 0.

20. An image forming apparatus comprising:

the image reading device according to claim 1; and an image forming portion that forms an image based on image information scanned in the image reading device.

* * * * *